United States Patent [19]

Ferri et al.

[11] Patent Number: 5,740,029

[45] Date of Patent: Apr. 14, 1998

[54] SOFTWARE ALGORITHM PROVIDING DYNAMIC CONFIGURATION OF DEAD BAND CONTROL CRITERIA WITHIN A MICRO BASED REAL TIME PROCESS CONTROL ENVIRONMENT

[75] Inventors: Vincent Ferri, Pittsburgh; Robert D. Dimsa, Elizabeth; Joseph C. Gray, Turtle Creek; Michael E. Romansky, North Huntingdon, all of Pa.

[73] Assignee: Westinghouse Air Brake Company, Wilmerding, Pa.

[21] Appl. No.: 604,656

[22] Filed: Feb. 21, 1996

[51] Int. Cl.$^6$ .......................... G05B 15/00; B60T 13/00; B61C 17/12

[52] U.S. Cl. .......................... 364/132; 364/426.01; 303/4; 303/9; 303/128; 246/182 B

[58] Field of Search .......................... 246/182 B; 303/3, 303/4, 9, 15, 128; 364/132, 426.01

[56] References Cited

U.S. PATENT DOCUMENTS

| | | | |
|---|---|---|---|
| 4,017,044 | 4/1977 | Anderson et al. | 246/182 B |
| 4,344,138 | 8/1982 | Frasier | 364/426.01 |
| 4,653,981 | 3/1987 | Harner et al. | 416/34 |
| 4,702,291 | 10/1987 | Engle | 105/35 |
| 4,735,385 | 4/1988 | Nickles et al. | 246/182 B |
| 4,904,027 | 2/1990 | Skanter et al. | 303/15 |
| 5,127,495 | 7/1992 | Verner et al. | 188/106 F |
| 5,382,885 | 1/1995 | Salcudean et al. | 318/568.11 |
| 5,564,795 | 10/1996 | Engle | 303/9 |
| 5,570,284 | 10/1996 | Roselli et al. | 364/423.099 |

Primary Examiner—Reba I. Elmore
Assistant Examiner—Robert J. Dolan
Attorney, Agent, or Firm—James Ray & Associates

[57] ABSTRACT

The invention provides a real time process control system for control of machinery. The system has a master control module and a slave control module which receives control signals from the master control module. Both control modules send control signals to a control effector and cause changes in at least one effect causing quality of the control effector. The slave control module establishes a target value for the effect causing quality of the control effector based on the signal it receives from the master microprocessor. A sensor connected to the control effector and to the slave control module provides signals in the slave control module which indicate an actual value for the effect causing quality of the control effector. A feedback loop controls the control signal from the slave microprocessor to the control effector to adjust the value of its effect causing quality in accordance with the target value. In the event that the signal from the master control module to the slave control module is interrupted a discrepancy between actual and target values of the effect causing quality indicates interruption of the signal. The invention provides an increased deadband for the feedback loop to permit a discrepancy large enough to be detectable and useable as an indication of interruption of the signal from the master control module to the slave control module.

12 Claims, 2 Drawing Sheets

SOFTWARE ALGORITHM PROVIDING DYNAMIC CONFIGURATION OF DEAD BAND CONTROL CRITERIA WITHIN A MICRO BASED REAL TIME PROCESS CONTROL ENVIRONMENT

FIELD OF THE INVENTION

The present invention relates, in general, to both a system and method utilized for real time microprocessor based control of preselected machinery and, more particularly, this invention is related to microprocessor based control of railway braking systems.

BACKGROUND OF THE INVENTION

As is generally well known in the art of controlling machinery, fluid filled conduits for control of machinery have been in widespread use for more than a century. Railroad braking systems based on a compressed air line as developed from the classical Westinghouse airbrake system are an example. Other examples may be found in the control of highway vehicles, submarines, aircraft, etc.

Generally these known systems have some amount of time delay between the initiation of a control signal and the actuation of the device being controlled. These delays can be quite significant for large systems. In particular, in a railway braking system, the time needed for a pressure reduction to travel along the length of a brake air line from a locomotive to a remote part of the train consist may be fifteen seconds or longer.

More rapid methods of signal transmission, for example, by electrical wires, electromagnetic signals, or optical transmission, are known. Nevertheless, in some cases it is desirable to continue to use a fluid conduit for carrying control signals due to the reliability of a fluid conduit. This is particularly the case for railway car braking systems which have a fail safe feature in that failure of the brake air line causes application of the brakes.

The reliability of the classical brake air line can be retained while benefitting from the more rapid transmission of signals by radio. This may be accomplished by having the lead locomotive of a train consist cause a brake application by changing (reducing) the pressure of air in the brake air line and simultaneously having it transmit a radio signal to computers disposed in one or more remote units.

In response to the radio signal, the computer in a remote unit will cause a change in the pressure in the brake air line in the vicinity of the remote unit and, hence, provide an accelerated transmission of the brakepipe pressure signal along the length of the train consist. A remote unit may, for example, be a locomotive located some predetermined distance down the line of cars from the lead locomotive. Such a system must act properly in the event of loss of the radio signal, particularly, because intervening terrain may block the signal.

An undesirable situation would exist, for example, under the following sequence of events. (1) The lead locomotive transmits a signal for a brake application by reducing its brakepipe pressure and transmits a radio signal to the remote locomotive to reduce its brakepipe pressure. (2) The radio signal is interrupted. (3) The lead locomotive calls for a reduction or removal of the brake application and begins increasing its own brakepipe pressure. (4) The increase in brakepipe pressure propagates down the line of cars to the remote locomotive causing its brakepipe pressure to rise. (5) The computer in the remote locomotive causes air to be vented, as it attempts to maintain the pressure value indicated by the most recent radio signal. Hence, the lead locomotive and the remote locomotive are working against each other.

The only method the remote locomotive has of signalling this condition to the lead locomotive (since the radio signal has been interrupted) is to initiate an emergency dump of brakeline air. When a reduced pressure caused by this emergency dump reaches the lead locomotive, it is interpreted as a signal that the radio signal has been interrupted and the train is then stopped.

Before small ruggedized digital computers (herein referred to as microprocessors) became available, the pressure in the brake air line was controlled by a pneumatic computer in the locomotive. For operation of a remote unit, a radio link transmitted the braking information from a pneumatic computer located in the lead locomotive to a pneumatic computer disposed in the remote locomotive.

With the introduction of microprocessors, however, these pneumatic computers are being replaced with microprocessors such as the WABCO Epic® system. A microprocessor based system, of this type, has many advantages over the previously used pneumatic system. These include economy, ease of maintenance, rapid response time, etc.

A microprocessor based system may also have a narrower deadband for feedback control of parameters such as the brake air line pressure. One disadvantage, however, which has been introduced by microprocessor based systems is that for the case cited above, in which the remote unit is controlling its brakepipe pressure at one level, while the lead locomotive is controlling its brakepipe pressure at another level, the narrow deadband offered by the microprocessor based system hides a change in brakeline pressure which would otherwise signal the need for an emergency dump of air.

The present invention is primarily intended to address this shortcoming in existing railway braking systems.

SUMMARY OF THE INVENTION

In a first aspect, this invention provides a real time process control system for control of machinery. The system has a master control module having a master microprocessor and a slave control module having a slave microprocessor. It has a control effector which has at least one effect causing quality. The control effector receives a first control signal from the master control module and the first control signal causes changes in the effect causing quality of the control effector. The control effector also receives a second control signal from the slave control module and the second control signal also causes changes in the effect causing quality of the control effector. Means are provided for sending a third control signal from the master control module to the slave control module and the slave control module uses this third control signal to determine a target value for the effect causing quality of the control effector. Sensing means are connected to the control effector and to the slave control module for determining an actual value of the effect causing quality and for generating signals in the slave control module indicating the actual value of the effect causing quality. A feedback loop is provided for adjusting the actual value of the effect causing quality in accordance with the target value of the effect causing quality. At least a portion of the feedback loop is disposed within the slave microprocessor in the slave control module. The portion of the feedback loop in the slave microprocessor has a deadband which is at least sufficient to permit the actual value of the effect causing quality to have a difference from the target value during an event in which the third control signal is interrupted, the difference being at least sufficient to generate at least one signal indicating interruption of the third control signal. Means are provided in the master control module or the slave control module, or in both, to respond to a signal indicating interruption of the third control signal and cause a change in the real time process control system, the change being appropriate for a case in which the third control signal has been interrupted.

In a further aspect, the invention provides a method for real time process control of machinery. The method involves sending a first control signal from a master control module to a control effector, the first control signal causing changes in an effect causing quality of the control effector. Likewise, the method includes sending a second control signal from a slave control module to the control effector, the second control signal causing changes in the effect causing quality of the control effector. The method includes sending a third control signal from the master control module to the slave control module, the slave control module using the third control signal to determine a target value for the effect causing quality of the control effector. An actual value is measured for the effect causing quality and signals are generated in the slave control module indicative of the actual value of the effect causing quality. The actual value of the effect causing quality is adjusted in accordance with the target value using a feedback loop, at least a portion of the feedback loop being located in the slave control module. One or more signals are provided within the slave control module to define a deadband for the feedback loop, the deadband being at least sufficient to permit the actual value of the effect causing quality to have a difference from the target value during an event in which the third control signal is interrupted, the difference being at least sufficient to generate at least one signal indicating interruption of the third control signal. The system then responds to a signal indicating interruption of the third control signal and cause a change in the real time process control system, the change being appropriate for a case in which the third control signal is interrupted.

In yet a further aspect, the invention provides a method for control of a railroad braking system which uses microprocessors. The method provides for the case of a lead locomotive having a master control module having a master microprocessor and a remote locomotive having a slave control module having a slave microprocessor. The remote locomotive receives radio signals for control of brakepipe pressure from the lead locomotive. The radio signal is subject to interruption. The method involves sensing, in the remote locomotive, a discrepancy between an actual value of brakepipe pressure in the remote locomotive and a target value of brakepipe pressure obtained from the radio signals. Means which include a feedback loop adjust the brakepipe pressure in the slave locomotive in accordance with the radio signals. A deadband is provided in the feedback loop to permit the actual value of brakepipe pressure to differ at least sufficiently from a latest value of brakepipe pressure from the radio link to generate a signal indicating loss of the radio signal. The train is then controlled in accordance with the signal indicating loss of the radio link.

OBJECTS OF THE INVENTION

It is, therefore, one of the primary objects of the present invention to provide an improved apparatus and method for control of machinery in which a control effector receives signals from two separate control modules.

Another object of the present invention is to provide an improved apparatus and method for control of machinery in which a fluid filled conduit serves as a control effector and the speed with which the fluid filled conduit conveys information is enhanced by having two or more signals affecting the fluid, the signals being imposed on different portions of the conduit and the signals being supplied through two or more control modules.

A further object of the present invention is to provide an improved apparatus and method for rapid coordination of two or more control modules which control an effect causing quality of a control effector, the rapid coordination being provided by a very rapid signal sent from one of the control modules to the other control module and the signal being subject to at least periodic interruption.

Still another object of the present invention is to provide a railroad braking system in which two locomotives, a lead locomotive and a remote locomotive, both control brakepipe pressure and the system includes a radio link which conveys braking commands from the lead locomotive to the slave locomotive and the radio link being subject to at least periodic interruption.

Yet a further object of the present invention is to provide a railroad braking system having a lead locomotive and a remote locomotive, both affecting brakepipe pressure, the remote locomotive controlling brakepipe pressure based on a radio link from the lead locomotive, the invention preventing the two locomotives from acting against each other in the event that the radio signal is interrupted.

In addition to the various objects and advantages of the present invention described above, it should be noted that various other objects and advantages of the present invention will become more readily apparent to those persons who are skilled in the art of machinery control from the following more detailed description of the invention, particularly, when such description is taken in conjunction with the attached drawings and with the appended claims.

DETAILED DESCRIPTION OF THE INVENTION

Figure 1:
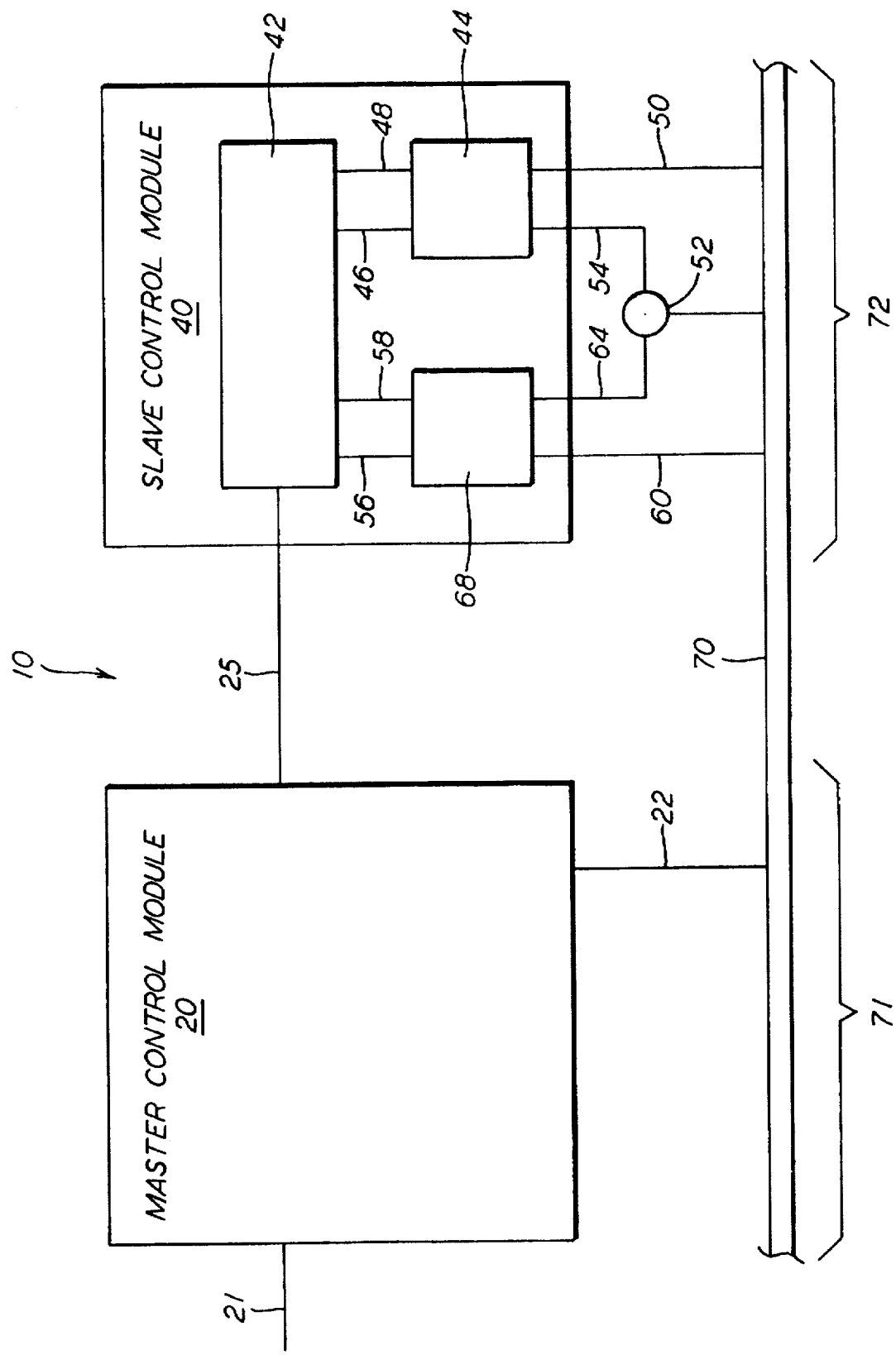
FIG. 1 is a general schematic diagram of a machinery control system according to one embodiment of the present invention.

Prior to proceeding to a more detailed description of various embodiments of the present invention, for the sake of clarity and understanding of the invention, it should be noted that identical components having identical functions in each of the accompanying drawings have been identified with identical reference numerals throughout each of the several figures illustrated herein.

FIG. 1 illustrates a system, generally designated 10, for control of certain preselected machinery. The system 10 has a master control module 20, a slave control module 40 and a control effector 70. Master control module 20 receives a control input signal 21 and, based on this input signal 21, generates a first control signal 22 which influences an effect causing quality in such control effector 70. Slave control module 40 sends a second control signal 50 which, also, influences the effect causing quality in control effector 70.

Master control module 20, also, generates a third control signal 25 which is received into slave control module 40.

Control module 40 has a means 42 to determine a target level for the effect causing quality in control effector 70 and, also, a means to determine a deadband for feedback of the control causing quality in control effector 70.

A first signal 46 indicative of the target level for the effect causing quality in control effector 70 is received by a feedback loop 44, along with a first signal 48 indicative of a control deadband. Feedback loop 44 receives sensor signal 54 from sensor 52. Sensor 52 indicates an actual level for the effect causing quality in control effector 70. Such feedback loop 44 generates a second control signal 50 to adjust a level of the effect causing quality of the control effector 70 to follow the target level indicated by first signal 46.

Means 68 are provided to respond to a discrepancy between the actual and target levels of the effect causing quality in control effector 70. Means 68 receives second target level signal 56 from means 42. It also receives second deadband magnitude signal 58 from means 42. It generates a signal 60 which makes a change in the effect causing quality of the control effector 70, the change being an appropriate response to a case in which the signal 25 has been interrupted and when a change has been made in the master control module 20 which causes the first control signal. 22 to be inconsistent with the second control signal 50.

Figure 2:
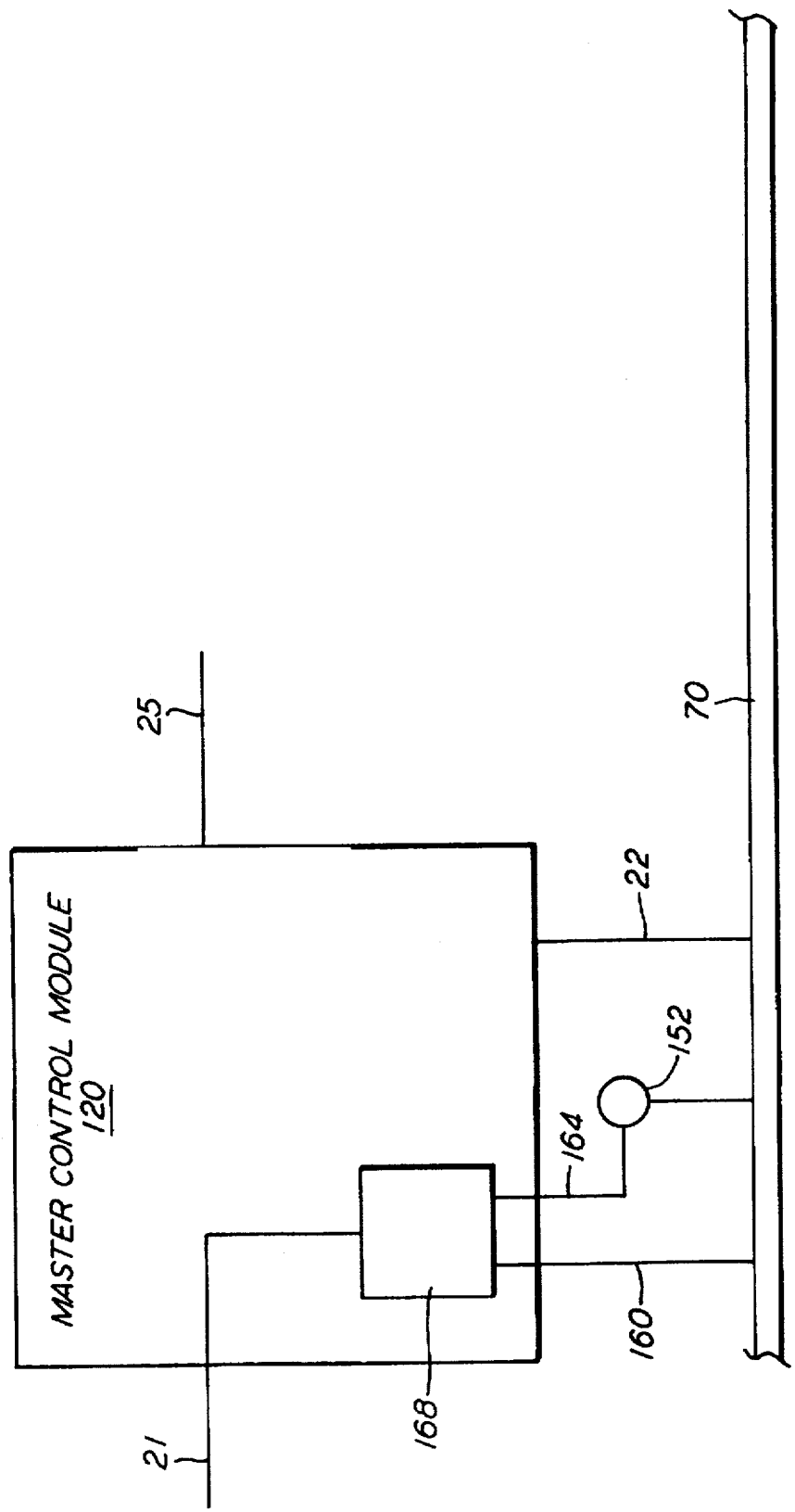
FIG. 2 is a general schematic diagram of a braking system for a train consist having a remote locomotive.

FIG. 2 shows an embodiment of the present invention having a means 168 in the master control module to make an appropriate response to a situation in which the signal 25 has been at least temporarily interrupted.

As illustrated therein, a sensor 152 provides a signal 164, which is indicative of the actual magnitude of the effect causing quality of the control effector 70. The means 168 then sends a signal 160 to make a change in the effect causing quality of the control effector 70, the change being an appropriate response to a case in which signal 25 has been interrupted, and when a change has been made in master control module 20 which causes the first control signal 22 to be inconsistent with such second control signal 50.

For an embodiment of particular interest, the master control module 20 is disposed in a lead locomotive of a train consist and slave control module 40 is disposed in a remote locomotive of the same train consist. In this embodiment, the control effector 70 is the brakepipe of the train and the effect causing quality of the control effector 70 is air pressure. The first control signal 22 supplies compressed air to brakepipe 70 and releases air from it, as needed, to maintain the required air pressure.

The slave control module 40 is disposed in the remote locomotive and it receives the third control signal 25 from the master control module 20. The third control signal 25 may be a radio link. In addition to conveying information representing a target level of brakepipe pressure, it may also carry information defining the mode of operation of the train consist.

Means 42, 44 and 68 may be provided by one or more programmed microprocessors located in the slave control module. Control of the brakepipe pressure is provided by the sensor 52 which measures brakepipe pressure and transmits it by signal 54 to the feedback loop 44. Feedback loop 44 controls the master air valve of the remote locomotive to provide the second control signal 50 which charges air to the brakepipe, or releases air from it, as needed, to maintain the target value of brakepipe pressure from module 42.

In a situation in which the third control signal 25 (which may be a radio link) has been at least temporarily interrupted and then the master control module 20 causes a change in the first control signal 22 to change the pressure in brakepipe 70, the system responds as follows: (1) The change in air pressure made by the first control signal 22 in the lead locomotive (not shown) will propagate down the line of railway cars (not shown) and is detected by sensor 52. The means 68 responds to the discrepancy by sending signal 60, which in this case is an emergency dump of brakepipe air pressure. When the pressure reduction caused by this dump of air pressure reaches the lead locomotive (not shown), it is detected by sensor 152. Means 168 will then generate an emergency dump of brakepipe air and stop the train consist. The motive power of the locomotive would also be eliminated in this case.

The presently most preferred embodiment of this invention is based on presently available railroad equipment. Both the master control module 120 in the lead locomotive and the slave control module 40 in the remote locomotive contain WABCO Epic® microprocessors (not shown). These are connected by a radio link which may, for example, be based on Harris Corporation's Locotrol system. Locotrol equipment in the remote locomotive is designed to initiate an emergency dump of brakepipe air if at least the following conditions are satisfied:

1. A service brake application is in effect, based on a radio signal from the lead locomotive.

2. Brake pipe pressure in the remote locomotive has risen above the service brake value by 2 psi or greater.

3. The brake pipe pressure rise condition has continued for about 2 seconds or longer.

The value for the deadband in the remote locomotive, which permits the brakepipe pressure to rise by 2 psi or greater above the latest received value of target brakepipe pressure obtained from the lead locomotive through the radio link, is defined as follows:

The deadband is set in the software generally at about 0.4 psi, unless the system is operating in DPC mode (The train has a remote powered locomotive). If the system is operating in DPC mode, the deadband is set in the software generally at about 1.4 psi.

Now discussing the invention more broadly, the invention provides a real time process control system 10 for control of preselected machinery. The system 10 includes a master control module 20 and a slave control module 40. It further includes a control effector 70 having at least one effect causing quality. For example, the control effector 70 could be a hydraulic or pneumatic control line and the effect causing quality could be at least one of fluid pressure and flow rate.

Alternatively, it could be a control wire in which the tension in the wire, or the voltage of the wire has a control effect. The control effector 70 receives a first control signal 22 from the master control module 20 and the first control signal 22 causes changes in the effect causing quality of the control effector 70. The control effector 70, also, receives a second control signal 50 from the slave control module 40, the second control signal 50, also, causing changes in the effect causing quality of the control effector 70.

The system 10 sends a third control signal 25 from the master control module 20 to the slave control module 40. The slave control module 40 has a means 42 which uses the third control signal 25 to determine a target value for the effect causing quality of the control effector 70.

Sensing means 52 are connected to the control effector 70 and to the slave control module 40 for determining an actual value of the effect causing quality of control effector 70 and for generating signals 54 in the slave control module 40 indicative of the actual value of the effect causing quality.

A feedback loop 44 is provided for adjusting the actual value of the effect causing quality in accordance with the target value of the effect causing quality. At least a portion of the feedback loop 44 being disposed within the slave control module 40. The feedback loop 44 receives a signal 48 which defines a deadband for the feedback loop 44, the deadband at least sufficient to permit the actual value of the effect causing quality to have a difference from the target value during an event in which the third control signal 25 is at least temporarily interrupted, the difference exceeding a predetermined level.

If the difference between the actual value and the target value for the effect causing quality exceeds a predetermined level defined by signal 48, the system 10 responds by generating a fourth control signal to cause a change in the effect causing quality of the control effector 70, the change appropriate to the event in which the third control signal 25 is interrupted. An appropriate change could be, for example, a change which places the system 10 in an emergency mode, or a change which stops operation of the system 10 entirely.

The control effector 70 may have a first end portion 71 which receives the first control signal 22 and a second end portion 72 which receives the second control signal 50. The value of the effect causing quality in the first end portion 71 of the control effector 70 affects the effect causing quality in the second end portion 72 of the control effector 70 after a first time delay, the effect causing quality in the second end portion 72 of the control effector 70 causing changes in the effect causing quality in the first end portion 71 of the control effector 70 after a second time delay, the third control signal 25 conveying information from the master control module 20 to the slave control module 40 with a third time delay.

The third time delay being significantly less than the first time delay and significantly less than the second time delay. This is most appropriate if the control effector 70 is quite extensive in space. For example, if control effector 70 is a fluid filled conduit, it may take some time for a control signal to propagate from first end portion 71 to second end portion 72, or from second end portion 72 to first end portion 71. The third control signal 25 may be an electrical, radio, or optical signal which conveys information much faster than the effect causing quality in control effector 70.

The process control system 10 may provide for control of brakes and such control effector 70 may be a fluid passage for the control of such brakes. The brakes may be on a train consist and the control effector 70 may be the brakepipe disposed along the length of the train.

In an embodiment in which the invention is applied to a train consist, the master control module 20 may be located in the lead locomotive of the train and the slave control module 40 may be located in a remote locomotive of the train.

The magnitude of the deadband in feedback loop 44 for control of the effect causing quality may be dependent on either one or more signals in the slave control module 40, the one or more signals being dependent on the operating mode of the train. The signal, for example, may indicate that the train has at least one remote locomotive and that the remote locomotive is under power. The signal indicative of an operating mode of the train may be communicated from the lead locomotive to the slave locomotive by the third control signal 25.

The process control system 10 may have means in the remote locomotive to provide a first response to a situation in which the brakes of the train have been applied, brakepipe pressure being changed by a first control signal from the lead locomotive and a second control signal from the remote locomotive, whereupon the third control signal is interrupted and the master control module in the lead locomotive sends a revised magnitude of the first control signal causing a reduction of a brake application.

The response may include opening an emergency dump valve to provide an emergency reduction of brakepipe pressure. This emergency dump may be recognized by means in the lead locomotive to sense the emergency reduction of brakepipe pressure and to stop the train.

In another aspect, the invention provides a method of real time process control of machinery. The method includes: sending a first control signal from a master control module to a control effector, the first control signal causing changes in an effect causing quality of the control effector. The method also includes sending a second control signal from a slave control module to the control effector, the second control signal causing changes in the effect causing quality of the control effector. Further, the method includes sending a third control signal from the master control module to the slave control module, the slave control module using the third control signal to determine a target value for the effect causing quality of the control effector.

Additionally, the method includes sensing an actual value of the effect causing quality and generating signals in the slave control module indicative of the actual value of the effect causing quality and adjusting the actual value of the effect causing quality in accordance with the target value of the effect causing quality in a feedback loop. The feedback loop is located at least partially within the slave control module.

The method further includes providing a signal within the slave control module to define a deadband for the feedback loop, the deadband being at least sufficient to permit the actual value of the effect causing quality to have a difference from the target value during an event in which the third control signal is interrupted, the difference being sufficient to generate at least one signal indicating at least a temporary interruption of the third control signal. This is used to cause a change in the real time process control system, which is appropriate to the event in which the third control signal is interrupted.

In a further aspect, the master control module may directly affect the effect causing quality in a first portion of the control effector and the slave control module may directly affect the effect causing quality in a second portion of the control effector. The effect causing quality in the first portion of the control effector causes changes in the effect causing quality in the second portion of the control effector after a first time delay and the effect causing quality in the second portion of the control effector causes changes in the effect causing quality in the first portion of the control effector after a second time delay. The third control signal conveys information from the master control module to the slave control module with a third time delay, the third time delay being significantly less than the first time delay and significantly less than the second time delay.

In an additional aspect, the invention provides a method for control of a railroad braking system with microprocessors, the method providing for the case of a lead locomotive having a master microprocessor and a remote locomotive having a slave microprocessor, the remote locomotive receiving radio signals for control of brakepipe pressure from the lead locomotive, the radio signals being subject at least to periodic interruption.

The method includes the step of sensing, in the remote locomotive, a discrepancy between an actual value of brakepipe pressure in the remote locomotive and a target value of brakepipe pressure obtained from the radio signals. The method also involves adjusting the brakepipe pressure in accordance with the radio signals in a feedback loop. At least a portion of the feedback loop being disposed in the slave microprocessor. A deadband is provided in the feedback loop to permit the actual value of such brakepipe pressure to differ sufficiently from the latest value of brakepipe pressure from the radio link to generate a signal indicating a loss of the radio signal.

The train is then controlled in accordance with the signal indicating loss of the radio link. The deadband may be provided by placing signals in the slave microprocessor, the signals acting as instructions to ignore a small discrepancy between the actual value of brakepipe pressure and a target value of the brakepipe pressure.

According to the invention the step of placing signals in the slave microprocessor includes at least one of inserting a computer chip having the instructions encoded thereon, reading in a computer disk having the instructions encoded thereon and reading in a computer tape having the instructions encoded thereon.

While the presently most preferred embodiment and various additional alternative embodiments for carrying out the instant invention have been set forth in detail in accordance with the Patent Act, those persons skilled in the art of machinery control to which this invention pertains will recognize various alternative ways of practicing the invention without departing from the spirit and scope of the appended claims.

Accordingly, to promote the progress of science and useful arts, we secure for ourselves by Letters Patent for a limited time exclusive rights to all subject matter embraced by the following claims.

We claim:

1. A real time process control system for control of preselected machinery, said real time process control system comprising:

(a) a master control module disposed within a lead locomotive of a train consist;

(b) a slave control module disposed within a remote locomotive of such train consist;

(c) a control effector, having at least one effect causing quality, connected to receive a first control signal from said master control module, said first control signal causing changes in said effect causing quality of said control effector, said control effector connected to receive a second control signal from said slave control module, said second control signal causing changes in said effect causing quality of said control effector;

(d) means connected to said master control module and said slave control module for sending a third control signal from said master control module to said slave control module, and for sending a signal indicative of an operating mode of such train;

(e) means disposed in said slave control module for using said third control signal to determine a target value for said effect causing quality of said control effector, and for generating a deadband signal based on said signal indicative of an operating mode of such train;

(f) sensing means connected to said control effector and to said slave control module for determining an actual value of said effect causing quality and for generating signals in said slave control module indicative of said actual value of said effect causing quality;

(g) a feedback loop having at least a portion thereof disposed within said slave control module for adjusting said actual value of said effect causing quality in accordance with said target value of said effect causing quality and said deadband signal, said deadband being at least sufficient to permit said actual value of said effect causing quality to have a difference from said target value during an event in which said third control signal is interrupted, said difference exceeding a predetermined level; and (h) means responsive to said difference exceeding said predetermined level to generate a fourth control signal to cause a change in said effect causing quality of said control effector, said change being appropriate to said event in which said third control signal is interrupted.

2. A system, according to claim 1, wherein said master control module directly affects said effect causing quality in a first portion of said control effector and said slave control module directly affects said effect causing quality in a second portion of said control effector, said effect causing quality in said first portion of said control effector causing changes in said effect causing quality in said second portion of said control effector after a first time delay, said effect causing quality in said second portion of said control effector causing changes in said effect causing quality in said first portion of said control effector after a second time delay, said third control signal conveying information from said master control module to said slave control module with a third time delay, said third time delay being significantly less than said first time delay and significantly less than said second time delay.

3. A system, according to claim 1, wherein said control effector includes a fluid passage and said control causing quality is at least one of fluid pressure and fluid flow.

4. A system, according to claim 3, wherein said fluid is air.

5. A system, according to claim 4, wherein said control causing quality is air pressure.

6. A system, according to claim 3, wherein said fluid passage is a fluid passage for control of brakes.

7. A system, according to claim 6, wherein said fluid passage is a fluid passage for control of brakes on a train.

8. A system, according to claim 1, wherein said third control signal is a radio link.

9. A system, according to claim 1, having means disposed in such remote locomotive to provide a first response to a situation in which such brakes of such train have been applied, brakepipe pressure being changed by a first control signal from such lead locomotive and a second control signal from such remote locomotive, whereupon said third control signal is interrupted and said master control module in such lead locomotive sends a revised magnitude of said first control signal causing a reduction of a brake application.

10. A system, according to claim 9, wherein said means disposed in such remote locomotive include means to open an emergency dump valve to provide an emergency reduction of brakepipe pressure.

11. A system, according to claim 10, having means disposed in such lead locomotive to sense said emergency reduction of brakepipe pressure and to stop such train.

12. A method for control of a railroad braking system with microprocessors, said method providing for the case of a lead locomotive having a master microprocessor and a remote locomotive having a slave microprocessor, said remote locomotive receiving radio signals for control of brakepipe pressure from said lead locomotive, said radio signals being subject at least to periodic interruption, said method comprising the steps of:

sensing, in said remote locomotive, a discrepancy between an actual value of brakepipe pressure in said remote locomotive and a target value of brakepipe pressure obtained from said radio signals;

adjusting said brakepipe pressure in accordance with said radio signals in a feedback loop, at least a portion of said feedback loop being disposed in said slave microprocessor;

providing a deadband in said feedback loop to permit said actual value of brakepipe pressure to differ sufficiently from a latest value of brakepipe pressure from said radio link to generate a signal indicating loss of said radio signal, said deadband dependent on an operating mode of such railway braking system, said deadband determined from said radio signals; and controlling said train in accordance with said signal indicating a loss of said radio link.

\* \* \* \* \*